US010567304B2

(12) United States Patent
Conner et al.

(10) Patent No.: US 10,567,304 B2
(45) Date of Patent: *Feb. 18, 2020

(54) CONFIGURING TRANSMISSION RESOURCES DURING STORAGE AREA NETWORK MIGRATION

(71) Applicant: International Business Machines Corporation, Armonk, NY (US)

(72) Inventors: Russell G. Conner, Sacramento, CA (US); Anthony M. Hunt, Hopewell Junction, NY (US); Daniel P. Toulan, Leland, NC (US); Johan van Kessel, Glasgow (GB); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,438

(22) Filed: May 10, 2019

(65) Prior Publication Data
US 2019/0268279 A1    Aug. 29, 2019

Related U.S. Application Data

(63) Continuation of application No. 14/818,395, filed on Aug. 5, 2015, now Pat. No. 10,305,814.

(51) Int. Cl.
*G06F 15/173* (2006.01)
*H04L 12/911* (2013.01)
(Continued)

(52) U.S. Cl.
CPC ............ *H04L 47/70* (2013.01); *G06F 3/0604* (2013.01); *G06F 3/067* (2013.01); *G06F 3/0647* (2013.01);
(Continued)

(58) Field of Classification Search
CPC ... H04L 47/70; H04L 67/1097; H04L 67/325; G06F 3/0604; G06F 3/0647; G06F 3/067
(Continued)

(56) References Cited

U.S. PATENT DOCUMENTS 7,489,639 B2   2/2009 Breitgand et al.
7,603,446 B2   10/2009 Brisse
(Continued)

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Brian Whipple
*Assistant Examiner* — Hannah S Wang
(74) *Attorney, Agent, or Firm* — Law Office of Jim Boice (57) ABSTRACT

One or more processors determine a throughput of hardware devices operatively coupled to a target Storage Area Network (SAN) prior to a SAN migration from a source SAN to the target SAN. Buffers within a processor core in the source SAN contain intermediate execution outputs of components within the processor core. The processor(s) determine an estimated time duration required to retrieve the soft state from a central processing unit (CPU) queue in the source SAN processor and to migrate the soft state of the processor core from the source SAN to the target SAN, in order to determine an estimated size and time of the SAN migration from the source SAN to the target SAN. The processor(s) then configure transmission resources available to the source SAN to comport with the estimated size and time of the SAN migration from the source SAN to the target SAN.

17 Claims, 8 Drawing Sheets

(51) Int. Cl.
*G06F 3/06* (2006.01)
*H04L 29/08* (2006.01)

(52) U.S. Cl.
CPC ........ *H04L 67/1097* (2013.01); *H04L 67/325* (2013.01)

(58) Field of Classification Search
USPC ....................................................... 709/226
See application file for complete search history.

(56) References Cited

U.S. PATENT DOCUMENTS

| | | |
|---|---|---|
| 7,844,432 B1 | 11/2010 | Jones |
| 8,375,180 B2 | 2/2013 | Chiu et al. |
| 8,677,093 B2 | 3/2014 | Hayashi |
| 8,688,773 B2 | 4/2014 | Dayley |
| 8,694,618 B2 | 4/2014 | Mugundan et al. |
| 2007/0130423 A1 | 6/2007 | Liu et al. |
| 2007/0245101 A1 | 10/2007 | Taguchi |
| 2008/0127182 A1 | 5/2008 | Newport |
| 2009/0177878 A1 | 7/2009 | Gao |
| 2011/0321041 A1 | 12/2011 | Bhat |
| 2012/0102258 A1 | 4/2012 | Hepkin |
| 2012/0170476 A1 | 7/2012 | Chen |
| 2012/0185644 A1 | 7/2012 | Kaneko |
| 2013/0332610 A1 | 12/2013 | Beveridge |
| 2014/0115164 A1 | 4/2014 | Kalyanaraman |
| 2014/0181398 A1 | 6/2014 | Bhat et al. |
| 2014/0280679 A1 | 9/2014 | Dey |
| 2015/0200833 A1 | 7/2015 | Cutforth |
| 2015/0234673 A1 | 8/2015 | Miyazaki |
| 2015/0331715 A1 | 11/2015 | Sathyanarayana |
| 2016/0088083 A1 | 3/2016 | Bharadwaj |

OTHER PUBLICATIONS

Kendall, D. G., "Stochastic Processes Occurring in the Theory of Queues and Their Analysis by the Method of the Imbedded Markov Chain", The Annals of Mathematical Statistics, 24 (3), 1950, pp. 338-354.

Zeng, L., et al., "Design and Implementation of Data Migration Algorithm on SAN", Compute Engineering, vol. 35, No. 4, Feb. 2009, pp. 53-55.

Anonymous, "Specifications of Input/Output Systems", IP.com, 000219834, Nov. 1, 1983 (Electronic Publication on Jul. 17, 2012), pp. 1-52.

IBM, "Storage Migrations Made Simple", IBM, IBM Global Technology Services, Dec. 2007, pp. 1-28.

U.S. Appl. No. 14/818,395, Non-Final Office Action dated Jul. 14, 2017.

U.S. Appl. No. 14/818,395, Final Office Action dated Feb. 16, 2018.

List of Patents and Patent Applications Treated As Related, May 10, 2019.

CONFIGURING TRANSMISSION RESOURCES DURING STORAGE AREA NETWORK MIGRATION

BACKGROUND

The present disclosure relates to the field of computers, and specifically to the field of computers that are used in storage area networks (SANs). Still more specifically, the present disclosure relates to the field of migrating data from a first SAN to a second SAN.

Storage migrations rely on SAN to SAN transfer of block-based data utilizing available throughput rates. Storage migrations are currently sized according to the capacity of the telecommunications wire between the originating datacenter and the receiving datacenter. The capacity of the wire (e.g., a physical pathway for data such as a network, an Ethernet wire, etc.) provides the system with an estimate of the amount of traffic the line can handle. This line size is compared against the number of terabytes (TB) of data to be migrated and the number of times the data will be migrated. However, this type of sizing methodology does not take into account that one or more disks at the target SAN may be degraded due to older technology (e.g., able to handle a lower number of Input-output Operations Per Second (IOPS)); the response time requirements by other workloads concurrently utilizing disk systems in the target SAN (i.e., what response times are required to be met by jobs that use the target SAN, which may be affected by a SAN migration); and any additional streams utilizing the SAN (such as backup migrations).

Currently, the SAN migration methodology does not utilize SAN constraints when sizing the timing of the migration. That is, only the line speed and the number of migrations are taken into account. Neither of these factors take into account the capabilities of the target SAN or the other workloads migrating across the fabric. That is, throughput can be constrained by a variety of factors, including the number of IOPS that can occur, response time, and throughput as measured by sustained Mega Byte (MB) transfer rate. Thus, constructing proper environments, restraints, and resources used during SAN migrations is often problematic, since there is not a clear picture of the capabilities of the fabric (i.e., the source SAN, the target SAN, and the network between the two SANs). This leads to improper sizing of blocks of data being migrated from one SAN to another SAN, leading to excessive migration times, overloading of resources in the source SAN and/or the target SAN, and increased error rates during the migration.

SUMMARY

A method, computer program product, and/or computer system configure transmission resources available to the source Storage Area Network (SAN) to comport, during a SAN migration from the source SAN to a target SAN, with an estimated time and size of the SAN migration from the source SAN to the target SAN. One or more processors determine a throughput of hardware devices operatively coupled to a target SAN prior to a SAN migration from a source SAN to the target SAN. The processor(s) retrieve a soft state from a source SAN processor utilized by the source SAN, where the source SAN processor includes a processor core, where the soft state is stored in buffers within the processor core, and where each buffer within the processor core contains an intermediate execution output of a component within the processor core. The processor(s) determine an estimated time duration required to retrieve the soft state from a central processing unit (CPU) queue in the source SAN processor and to migrate the soft state of the processor core from the source SAN to the target SAN. The processor(s) determine an estimated size and time of the SAN migration from the source SAN to the target SAN based on the estimated time duration required to retrieve the soft state from the CPU queue in the source SAN processor, an estimated time to migrate the soft state of the processor core from the source SAN to the target SAN, and the throughput of the hardware devices. The processor(s) then configure transmission resources available to the source SAN to comport with the estimated size and time of the SAN migration from the source SAN to the target SAN.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
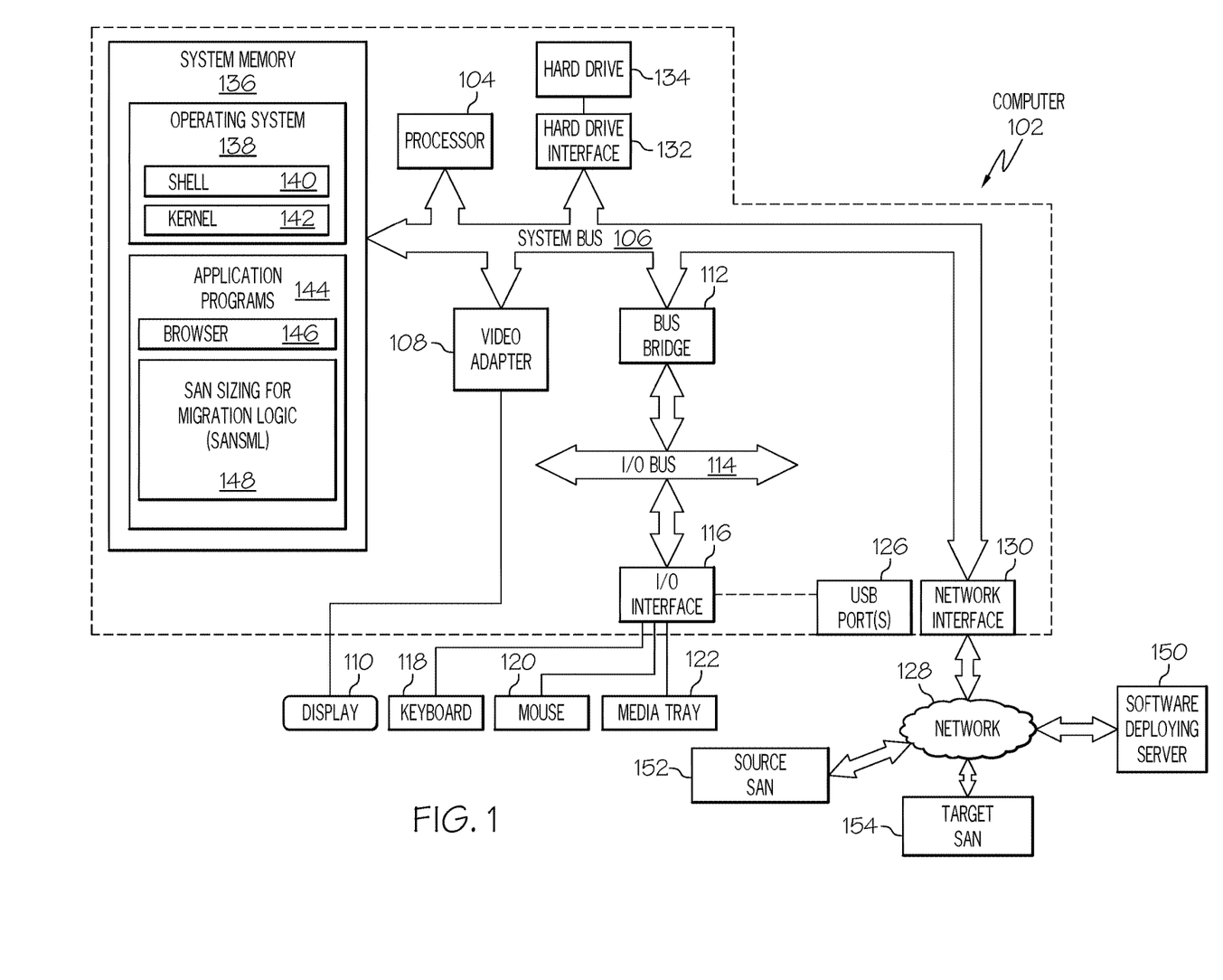
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or source Storage Area Network (SAN) 152 and/or target SAN 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. IO interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, and/or source SAN 152 and/or target SAN 154 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include Storage Area Network Sizing for Migration Logic (SANSML) 148. SANSML 148 includes code for implementing the processes described below, including those described in FIGS. 2-5. In one embodiment, computer 102 is able to download SANSML 148 from software deploying server 150, including in an on-demand basis, wherein the code in SANSML 148 is not downloaded until needed for execution. In one embodiment of the present invention, software deploying server 150 performs all of the functions associated with the present invention (including execution of SANSML 148), thus freeing computer 102 from having to use its own internal computing resources to execute SANSML 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention utilize a mathematical model that shows, through the use of queuing and simulation modeling, the impact of external factors to the migration throughput. From an end-to-end migration analysis, one or more embodiments of the present invention enable the SAN subsystem and fabric to function as queuing entities. In one or more embodiments of the present invention, a virtualized SAN switch (i.e., a virtualized adapter) functions as a secondary queue. In one or more embodiments of the present invention, the system accounts for the impact of parallel migrations (i.e., file-based or image based) against response time mechanism in the source SAN and/or the target SAN.

Thus, the present invention presents a novel approach to SAN migration, including but not limited to sizing SAN migration throughput prior to the SAN migration. In the prior art, the line speed between the two SAN devices was assumed to be the limiting factor. The present invention, however, also takes the ability of the hardware and other resources in the source SAN and the target SAN into account (such as the IOPS available and the sequential transfer rate), as well as any other workloads currently migrating across the telecommunications line, when sizing SAN migrations.

Thus, one or more embodiments of the present invention enable the setting of expectations for data transfer based on SAN hardware/resource sizing, not just line sizing. For example, in a case where a 10 Gb/E line connects an antiquated disk (having a storage transfer rate of only 1 Gbps) in a source SAN to a current generation storage device (having a storage transfer rate of 10 Gbps) in a target SAN, only 1 Gbps can be pushed, since it is the 1 Gbps rate of the antiquated disk that limits the speed of the SAN migration. Similarly, if the source SAN has a high-speed storage device (e.g., 10 Gbps) while the target SAN has a low-speed storage device (e.g., 1 Gbps), then the limit for SAN migration is still 1 Gbps.

Figure 2:
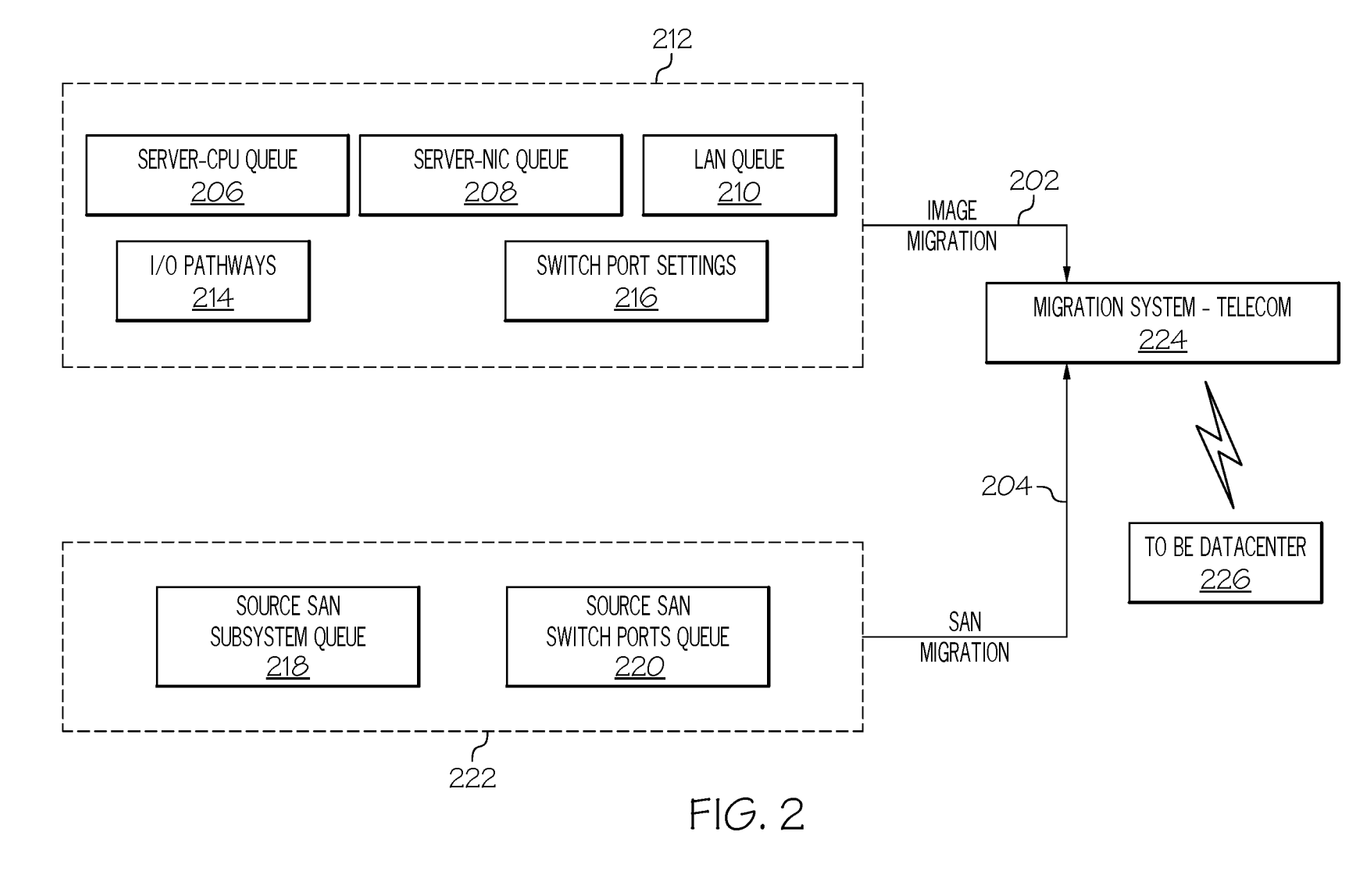
FIG. 2 illustrates an overview of a Storage Area Network (SAN) migration in accordance with one or more embodiments of the present invention.

With reference now to FIG. 2, a high-level overview of a SAN migration from a source SAN to a target SAN is presented. The SAN migration includes an image migration 202, which migrates configuration features of devices, operating systems, and/or applications within the source SAN, as found in the contents of server-CPU queue 206, server-NIC queue 208, and Local Area Network (LAN) queue 210 (collectively depicted in block 212); and a SAN migration 204, which migrates data itself from the source SAN, as found in the source SAN subsystem queue 218 and the source SAN switch ports queue 220 (collectively represented by block 222 as the data in the source SAN that is being migrated to the target SAN).

Server-CPU queue 206 includes soft and hard state data related to a server and its Central Processing Unit (CPU) used in the target SAN. Within the server's CPU is a core (i.e., circuitry that includes registers, execution unit, instruction translators, L-1 and L-2 cache, etc.). Each core has a hard state and a soft state. The "hard state" is defined as the information within the core that is architecturally required for the core to execute a process from its present point in the process. The "soft state", by contrast, is defined as information within the core that would improve efficiency of execution of a process, but is not required to achieve an architecturally correct result. For example, the hard state comes from the contents of user-level registers, such as a Link and Count Register (LCR), General Purpose Registers (GPRs), Floating Point Registers (FPRs), etc. The soft state comes from the contents of both "performance-critical" information, such as the contents of L-1 instruction caches, L-1 data caches, address translation information found in a Data Translation Lookaside Buffer (DTLB) and Instruction Translation Lookaside Buffer (ITLB), as well as less critical information, such as contents of a Branch History Table (BHT) and all or part of the content of an L-2 cache. Whenever a software thread enters or leaves the core, the hard and soft states are respectively populated or restored, either by directly populating the hard/soft states into the stated locations, or by flushing them out entirely using context switching.

In an alternative embodiment of the present invention, the content of the server-CPU queue 206 that is migrated during the SAN migration is higher-level information found in a program source code, rather than the contents of registers/caches within the core. That is, in this embodiment the cache data is merely a pointer to a particular line of code being executed by the server-CPU. Thus, when the "state" of the server-CPU is replicated in the target SAN, the running program is merely reloaded with directions (from the pointer) to continue execution of the running program from the position within the application to which the pointer is pointing.

Information in the server-NIC queue 208 includes data that is in the queue of a Network Interface Card (NIC) used by the server-CPU used in the source SAN. That is, any data that is queued to be sent/received to/from a network by a NIC in the source SAN (in order to establish communication with the network) is found in the server-NIC queue 208.

Information in the LAN queue 210 includes data that is used by a local/internal network in the source SAN, which allows the server-CPU and storage devices within the source SAN to communicate. That is, the LAN queue 210 includes configuration packets (rather than packets containing data being stored by the SAN) that are waiting to be placed on the LAN for transport to and from the server-CPU, storage devices, etc. within the source SAN.

Information found in block 212 also describes the number of paths to an I/O subsystem (e.g., storage device) within the source SAN, which is found in I/O pathways block 214. That is, if the source SAN has "n" storage devices, then there will be "n" pathways to these storage devices, as shown within I/O pathways block 214. In one embodiment, these pathways are shared between a single or multiple ports, such that multiple pathways go through a single port or through otherwise shared multiple ports. In another embodiment, each pathway is assigned to a different port.

Information found in block 212 also includes information describing the setting of switch ports for the source SAN, which is found in the switch port settings block 216. These settings describe the permitted and/or negotiated speed that data packets can be processed, and can be variable, such as "low", "medium", or "high". That is, if the switch port for the I/O is set to "low", then only a low number of packets are accepted per unit of time, thus ensuring that the storage devices are able to handle the incoming/outgoing data from the (source) SAN. However, if the switch port for the I/O is set to "High", then more data can go to and from the storage devices within the SAN, but at a higher risk of overloading the storage devices, bandwidth of the SAN fabric, etc.

The source SAN subsystem queue 218 includes data within the storage devices in the source SAN that is to be migrated.

The source SAN switch ports queue 220 includes data from the storage devices that has been queued up for migration to the target SAN.

Thus, as noted above, information within block 222 describes the actual storage data that is to be migrated from the source SAN to the target SAN.

Information from the image migration 202 and the SAN migration 204 is then passed to a migration system, such as the migration system—telecom 224, which is a network (e.g., network 128 shown in FIG. 1) that communicates data from the source SAN (e.g., source SAN 152 shown in FIG. 1) to a target SAN (e.g., target SAN 154 shown in FIG. 1), which is part of the "To Be Datacenter" 226 shown in FIG. 2.

Depending on the criticality of applications, the quantity of data to be moved and allowable downtime, there are a variety of tools that organizations can use to migrate data in a SAN migration. Thus, various embodiments of the present invention utilize one or more of the following SAN migration techniques.

Offline Migration Methods

Offline migration methods require that applications be taken offline during data movement, and therefore are suitable only when significant downtime can be tolerated.

One type of offline migration is to restore from backup tapes. This method involves making a backup copy of data, then taking the associated arrays and/or servers offline to ensure that no new data is added. The data is then restored from the backup tapes to the new arrays and/or servers. Once the restore process is complete, the systems are brought online.

Another type of offline migration is to use a File Transfer Protocol (FTP) transfer. This method involves manually copying files from the source systems to the target systems via File Transfer Protocol (FTP).

Online Migration Methods

Online migration methods generally allow data movement while applications are up and running. Online migration methods include array-based replication, volume management or replication, and host-based mirroring.

Array-based replication moves arrays of data between similar types of storage devices found in the source SAN and the target SAN.

Volume management or replication maps the logical view of storage space with the actual physical disks in the source SAN, and then maps this volume to a logical view in the target SAN.

Host-based mirroring or replication solutions provide file-by-file data movement to create a secondary data copy of data from the source SAN on the target SAN. Thus, a server, acting as a host, facilitates the creation of different copies of files during SAN migration.

In addition, on-line migration can utilize migration from backup tapes and/or FTP transfers as discussed above with regard to offline migration.

These types of SAN migration are exemplary only, and are not to be construed as limiting the scope of the present invention.

In accordance with various embodiments of the present invention, the following parameters are taken into account when sizing and/or performing a SAN migration.

SAN subsystem as queuing entity—measured by the IOPS available. This parameter highlights the difference between older technology disks (e.g., pushing 10-12K Input/output Operations Per Second—IOPS) versus newer technology (e.g., pushing 50K IOPS). This is a deterministic value.

SAN switch virtualization—measured by switch setting. In many cases the switch is set to "low" which degrades the throughput rate on purpose to ensure lack of production impact by elongation of response times due to hard drive contention. Alternative settings include, but are not limited to, low/medium/high. When multiple customers are going through the line, this further impacts the throughput available. In one or more embodiments of the present invention, SAN virtualized switches that use common outsources are set to only accept a 1 to 4 Gbps transfer.

Throughput benchmark for reads and writes at the source and destination site. This is the sequential transfer rate that can be continuously sustained, based on the abilities of the source SAN (including those of the storage device discussed in reference to block 212 in FIG. 2) as well as those of the target SAN (e.g., the "To Be Datacenter" 226 shown in FIG. 2).

Components

The SAN subsystem as a queuing entity can be solved by a generalized M/M/1 queue as the arrivals (characterized by the blocks of data migrating) occur at e according to a Poisson process. The M/M/1 process describes a system where arrivals form a single queue (through a single port) and are governed by a Poisson process, there are "c" servers (the number of networking segments that can be processed in parallel, usually dependent on the number of ports assigned on the SAN switch), and job service times are exponentially distributed. Note that in other applications, there will not be an infinite queue and the system can become unstable, resulting in either death of packets or instability of the system.

Thus, lambda is the arrival rate of data packets at the target SAN, i is the service rate of the target SAN, and rho is utilization where rho=ë/ì, assuming that rho<1 and the system is stable.

Other workloads may be migrating concurrently. Such workloads are interleaved through the migration line when there is a SAN migration and a corresponding image migration, thus adding additional workload. However, the two workloads may have a different behavior. One may be migrating on a TCP/IP basis (e.g., in a backup process) and need to be individually sized. Since this is a straight line utilization, this can be simply measured in percentage of line utilization (i.e., total workloads running at 20 Mbps or 10% line utilization).

SAN Switch Virtualization is utilized in one or more embodiments of the present invention. The element is provided as a simulation between 0 and the switch port size (usually 4 Gbps or 8 Gbps). This element is provided as a simulation of existing work utilizing the SAN and the SAN port. In one or more embodiments, two or more simulations are run, including a simulation for a lower work throughput denoting non-prime times and another simulation for higher work throughput denoting prime time processing. These simulations provide an estimate of the workflow going through the SAN, either by Mbps or percentage of line utilization, and show how much available capacity at the port level is available for SAN data migration activities when compared against production utilization of the switch.

Throughput benchmarks for reads and writes at the source and destination site (the sequential transfer rate that can be continuously be sustained) give the usable hardware capacity of the environment.

Figure 3:
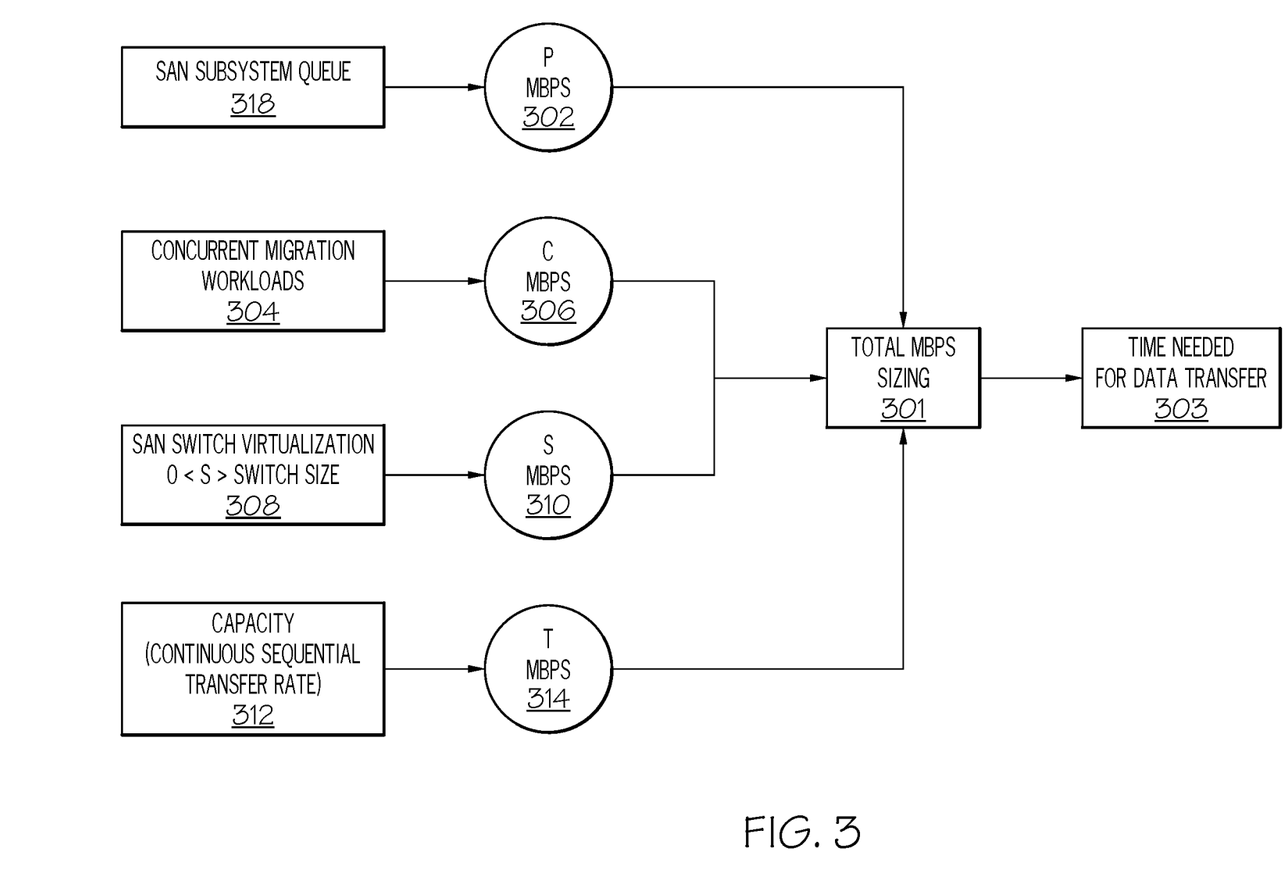
FIG. 3 depicts factors utilized in a SAN migration in accordance with one or more embodiments of the present invention.

With reference now to FIG. 3, a high-level flow-chart of a SAN migration is presented.

A SAN subsystem queue utilization for SAN subsystem queue 318 (analogous to element 218 in FIG. 2) is calculated as the arrival rate divided by the service time, giving the value P, which is reported as Mbps (element 302). In one or more embodiments, this information is derived from an examination of the SAN components by the presently described system.

The concurrent migration workloads 304 are then obtained as a straight calculation of Mbps, depicted in element 306 as C.

The SAN Switch Virtualization simulation is then run in block 308, showing the available switch capacity S (element 310) based on the switch size (number of ports) and each port's port speed (usually 4 Mbps or 8 Mbps).

The capacity (i.e., the continuous sequential transfer rate) of the disks themselves shown in element 312 is then calculated (shown as "T" in circle 314).

All of the determined speeds/capacities are then input into a total Mbps sizing system 301 (e.g., computer 102 shown in FIG. 1), leading to a determination of the amount of time needed for the data transfer from one SAN to another SAN (block 303).

Figure 4:
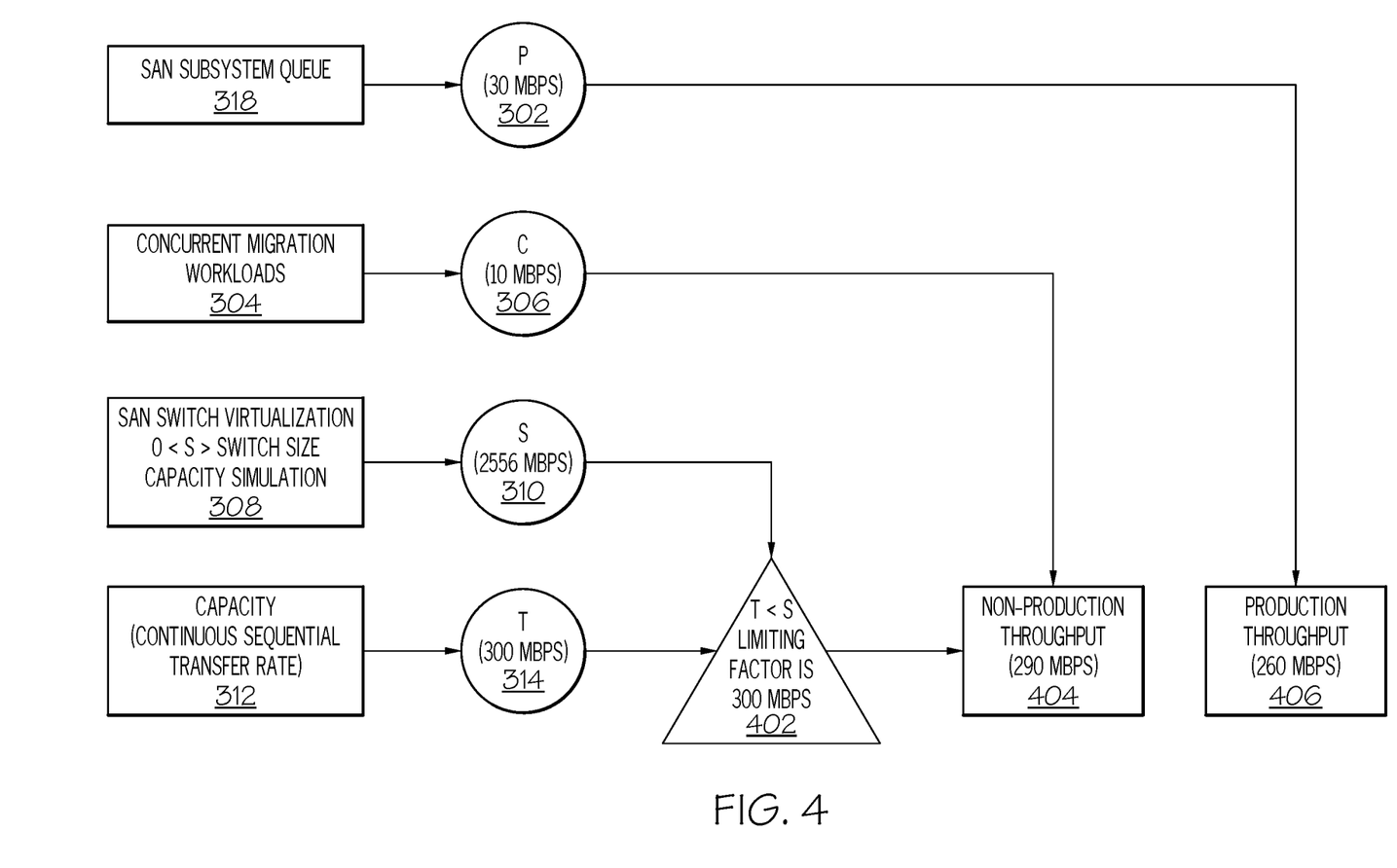
FIG. 4 illustrates an exemplary use-case of a SAN migration in accordance with one or more embodiments of the present invention.

These results lead to FIG. 4, in which the following exemplary results are derived.

Assume that the SAN subsystem queue can be calculated at 30 Mbps transfer rate (P=30). When looking at the Concurrent Migration Workloads, assume that a 10 Mbps transfer rate (C=10) is determined. The SAN Switch Virtualization shows that when run between 0 Gbps and 4 Gbps, an average at 1.5 Gbps (or 1540 Mbps) results, such that S=2556 Mbps (S=(4*1024)−1540=2556 Mbps switch capacity available). The Sequential Transfer rate that can be handled in this system is determined to be 300 Mbps (T=300) (block 402).

Therefore, since T<S, the total throughput (usable) limiting factor is 300 Mbps. The Concurrent Migration workloads use 10 Mbps, so the total throughput available for SAN migration is 290 Mbps (block 404). When production workloads are running, these workloads require 30 Mbps. If the system utilizes only 10 Mbps, the rest of the capacity available on the system is available for use. That is, if only 10 Mbps were utilized (following the rate of SAN transfer used by the concurrent migration workloads 304), then the total transfer time for 15 GB (120,000 Mb) would equal 8.33 minutes (120,000/10=12,000/(1440)), even though 290 Mbps of bandwidth are actually available. However, if the system uses the entire available capacity available (290 Mbps during non-production times), then 15 GB (120,000 Mb) would take 0.29 minutes (120,000/290=413/(1440) =0.29 minutes). Even during with production times in which 30 Mbps are required for the existing workload (block 406), the system will still have available 290 Mbps−30 Mbps (260 Mbps).

Thus, when dealing with petabyte sized datacenter migrations, a difference of 8.33 vs. 0.29 minutes can significantly cut costs, time, and resource usage, thereby providing a significant improvement over the prior art that used only 10 Mbps (by following the constraints of the concurrent migration workloads 304). That is, by accurately predicting the bandwidth available for a SAN migration, costs are reduced, since SAN migration jobs can be efficiently queued and scheduled without unnecessary wait times.

Figure 5:
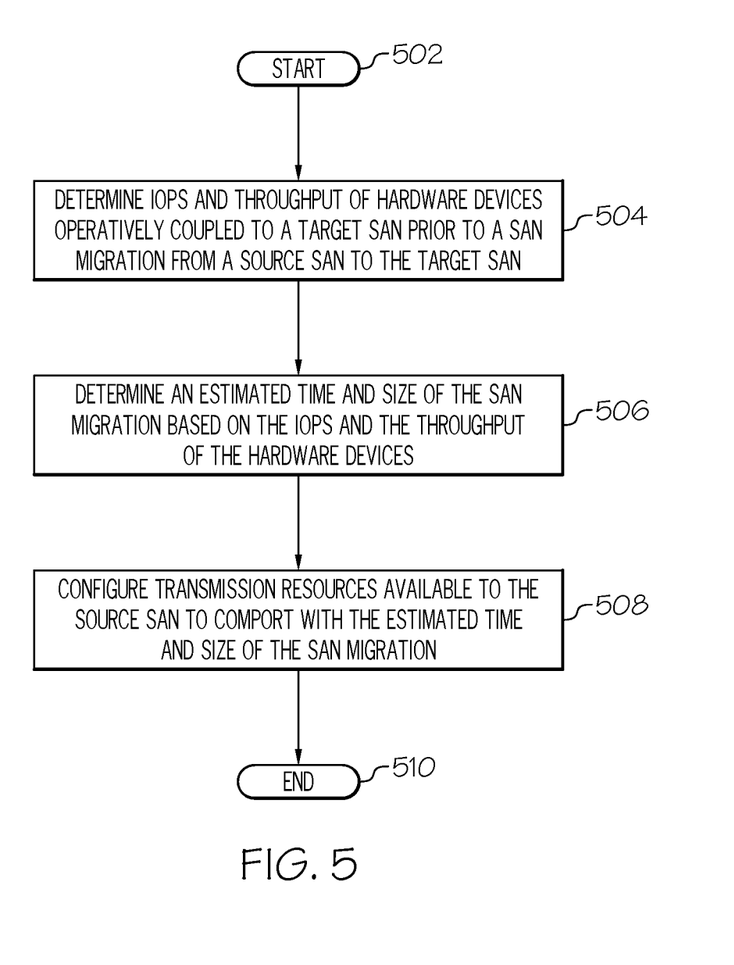
FIG. 5 is a high-level flow chart of one or more steps performed by a processor to size SAN storage migrations.

With reference now to FIG. 5, a high-level flow chart of one or more steps performed by one or more processors to size SAN storage migrations is presented.

After initiator block 502, one or more processors determine Input/output Operations Per Second (IOPS) and throughput of hardware devices operatively coupled to a target Storage Area Network (SAN) and/or a source SAN prior to a SAN migration from the source SAN to the target SAN (block 504).

As depicted in block 506, one or more processors determine an estimated time and size of the SAN migration based on the IOPS and the throughput of the hardware devices.

As described in block 508, one or more processors configure transmission resources available to the source SAN and/or the target SAN to comport with the estimated time and size of the SAN migration. That is, based on how long it will take to migrate the SAN, resources are reallocated such that if the time will take too long, additional resources (e.g., ports, networks, switches, storage devices, etc.) are reallocated to the process. Alternatively, if the time required is minimal (i.e., the system is over-engineered with too many resources), then some of the resources are taken off line by the system.

The flow-chart ends at terminator block 510.

Thus, the present invention provides the utility of accurately sizing SAN storage migrations in a way that is not available in the prior art, thereby increasing the efficiency of resource usage.

In one or more alternative embodiments of the present invention, one or more processors further determine the estimated time and size of the SAN migration by using a SAN subsystem of the target SAN as a queuing entity, where the SAN subsystem simulates the IOPS of the hardware devices operatively coupled to the target SAN. That is, by simulating the IOPS of the hardware devices by a SAN subsystem during SAN migration sizing, a more accurate determination is made of the SAN sizing than that provided in the prior art.

In one or more embodiments of the present invention, one or more processors further determine the estimated time and size of the SAN migration by using a SAN virtualized switch, wherein the SAN virtualized switch simulates the throughput of the hardware devices operatively coupled to the target SAN by emulating switch ports used by the target SAN. That is, by simulating the throughput of the hardware devices by a SAN subsystem during SAN migration sizing, a more accurate determination is made of the SAN sizing than that provided in the prior art.

In one or more embodiments of the present invention, one or more processors determine the IOPS and throughput of the hardware devices operatively coupled to the SAN based on an M/M/c queue of the SAN virtualized switch, wherein the M/M/1 queue represents a queue length of a queue for the SAN virtualized switch based on an arrival rate (M/) of packets at the SAN virtualized switch and a departure (/M) rate of packets from the SAN virtualized switch based on the number of available servers (c). By examining the M/M/c queue while determining the IOPS and throughput of the hardware devices, a more accurate determination is made of the SAN sizing than that provided in the prior art.

In one or more embodiments of the present invention, one or more processors determine the arrival rate and the departure rate at the server by a Poisson process that predicts the arrival rate and the departure rate at different predicted time points during the SAN migration. That is, the predicted number of arriving packets (lambda) during a period of time divided by a service rate mu (e.g., how many packets can be handled by the server during that same period of time) leads to rho, which represents the usage rate of the device. That is, if 10 packets arrive during a certain period of time at a device that can handle 50 packets during that period of time, then the device is operating at 20% (10/50) capacity. Note that the Poisson process is used, since the period of time may vary during the SAN migration, such that rho will likewise vary during the SAN migration.

In one or more embodiments of the present invention, one or more processors predict a root cause of a throughput slowdown during the SAN migration based on the IOPS and the throughput of the hardware devices. For example, if the maximum IOPS/throughput allows only 260 Mbps to be processed in the SAN migration, then in FIG. 4 the switch capacity shown in element 310 of 2556 Mbps cannot be a limitation/root cause of the throughput slowdown.

As described herein, in one or more embodiments of the present invention, one or more processors determine the throughput of hardware devices operatively coupled to a target SAN according to a production throughput, wherein the production throughput is equal to total available bandwidth for SAN migration minus bandwidth used by currently running production workloads on the target SAN, as described in detail in FIG. 3 and FIG. 4.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
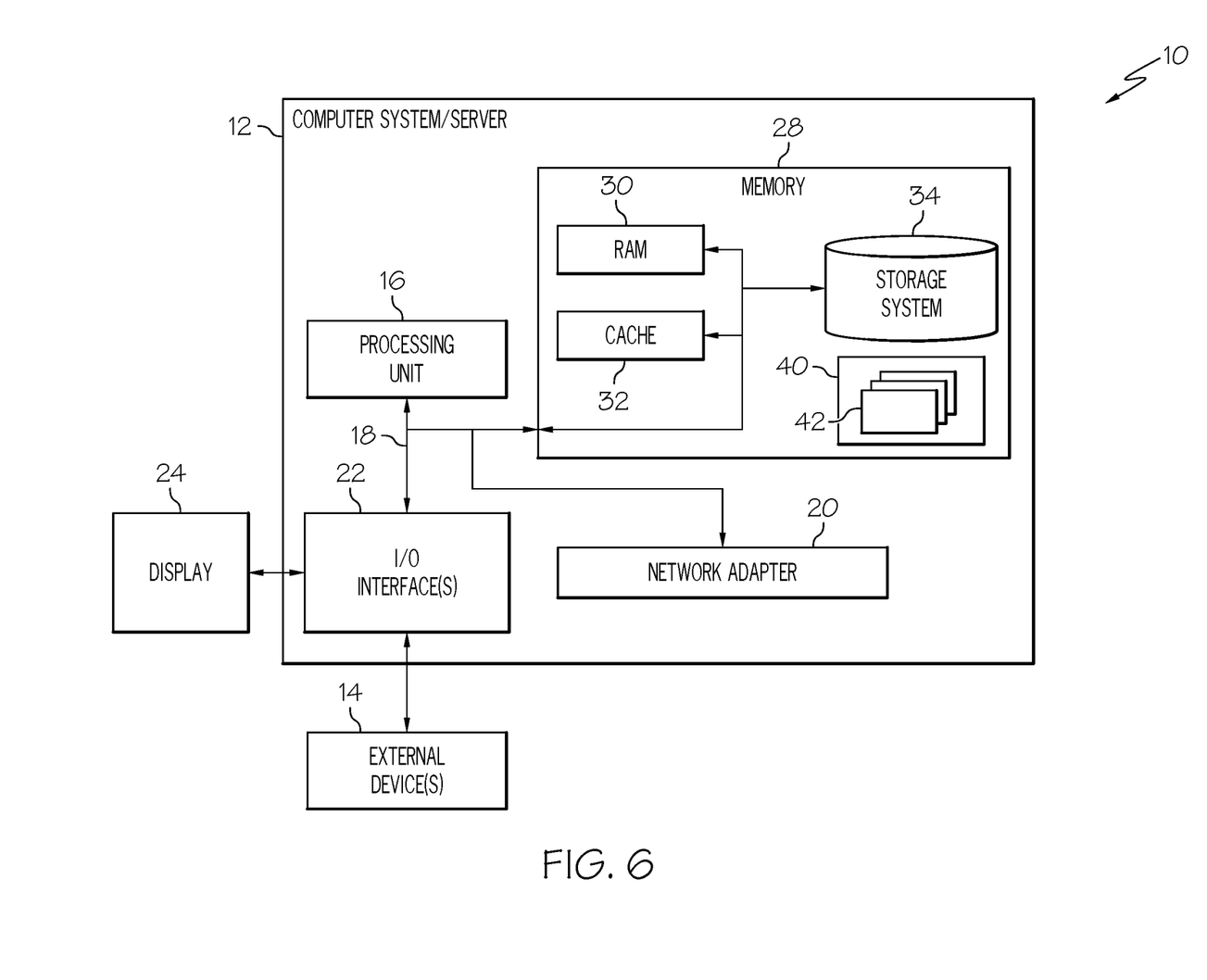
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
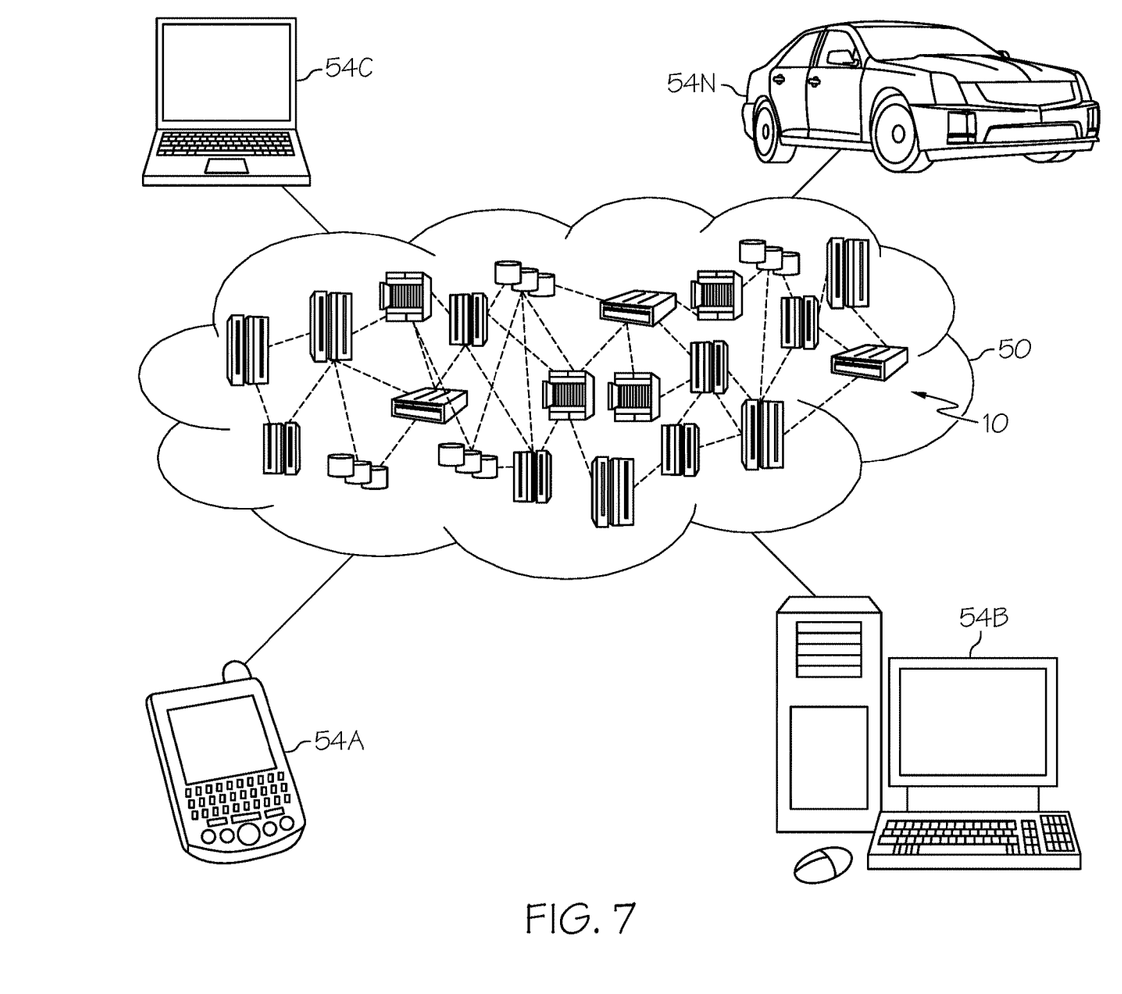
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
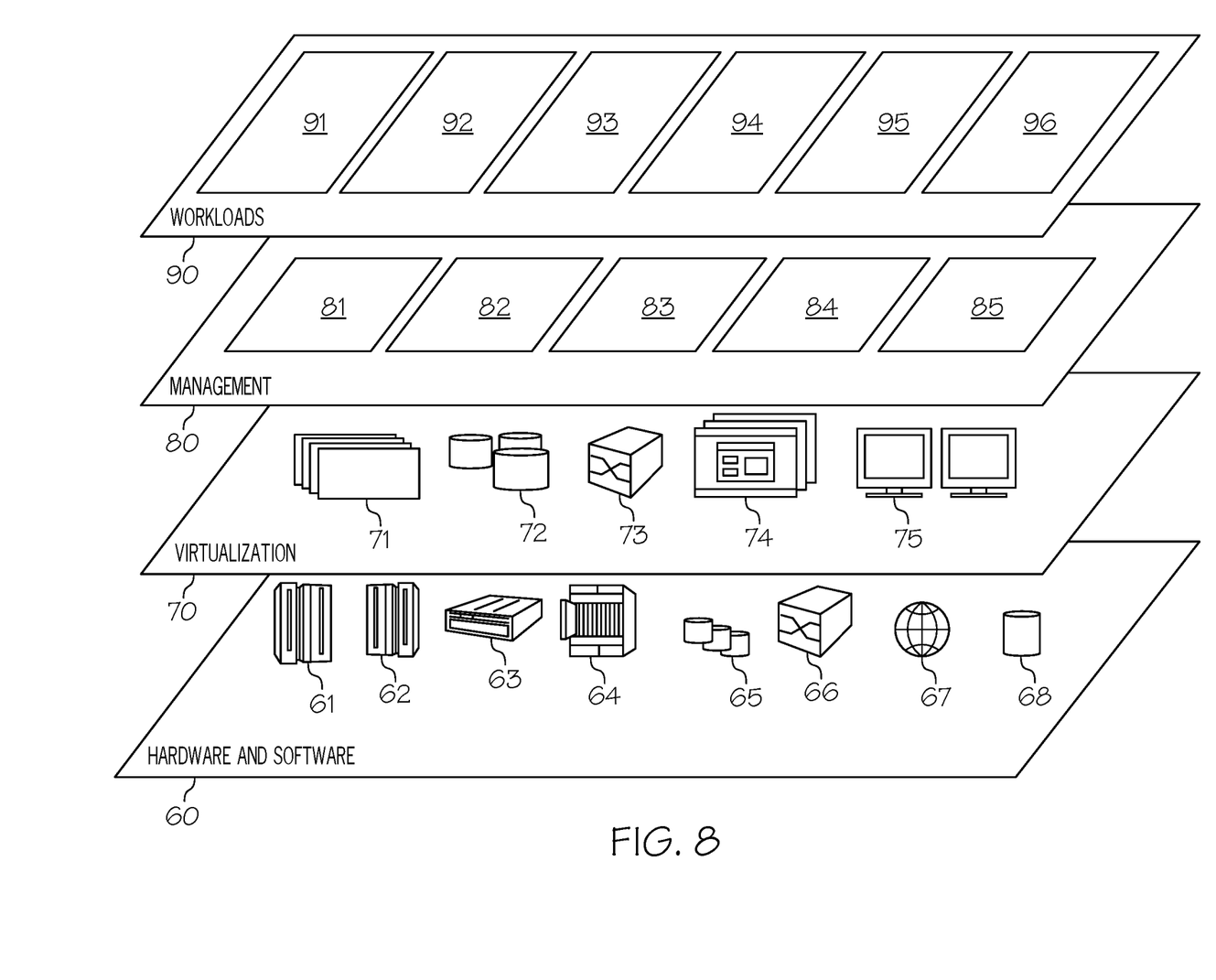
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SAN migration sizing processing 96 (for sizing SAN storage migration as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   determining, by one or more processors, throughput of hardware devices operatively coupled to a target Storage Area Network (SAN) prior to a SAN migration from a source SAN to the target SAN;

retrieving, by one or more processors, a soft state from a source SAN processor utilized by the source SAN, wherein the source SAN processor includes a processor core, wherein the soft state is stored in buffers within the processor core, and wherein each buffer within the processor core contains an intermediate execution output of a component within the processor core;

retrieving, by one or more processors, information from a Network Interface Card (NIC) queue in the source SAN and a Local Area Network (LAN) queue in the source SAN, wherein the NIC queue in the source SAN contains queued data to send to the target SAN, and wherein the LAN queue in the source SAN includes configuration packets used in the SAN migration;

determining, by one or more processors, an estimated time duration required to retrieve the soft state from a central processing unit (CPU) queue in the source SAN processor and the information from the NIC queue and the LAN queue in the source SAN, and to migrate the soft state of the processor core and the information from the NIC queue and the LAN queue in the source SAN from the source SAN to the target SAN;

determining, by one or more processors, an estimated size and time of the SAN migration from the source SAN to the target SAN based on the estimated time duration required to retrieve the soft state from the CPU queue in the source SAN processor and the information from the NIC queue and the LAN queue in the source SAN, an estimated time to migrate the soft state of the processor core and the information from the NIC queue and the LAN queue in the source SAN from the source SAN to the target SAN, and the throughput of the hardware devices; and configuring, by one or more processors, transmission resources available to the source SAN to comport with the estimated size and time of the SAN migration from the source SAN to the target SAN.

2. The method of claim 1, further comprising:
further determining, by one or more processors, the estimated size and time of the SAN migration by using a SAN virtualized switch, wherein the SAN virtualized switch simulates the throughput of the hardware devices operatively coupled to the target SAN by emulating switch ports used by the target SAN.

3. The method of claim 2, further comprising:
determining, by one or more processors, Input/output Operations Per Second (IOPS) of the hardware devices; and
determining, by one or more processors, the IOPS and throughput of the hardware devices operatively coupled to the target SAN based on an M/M/1 queue of the SAN virtualized switch, wherein the M/M/1 queue represents a queue length of a queue for the SAN virtualized switch based on an arrival rate of packets at the SAN virtualized switch and a departure rate of packets from the SAN virtualized switch.

4. The method of claim 3, further comprising:
determining, by one or more processors, the arrival rate and the departure rate by a Poisson process that predicts the arrival rate and the departure rate at different predicted time points during the SAN migration.

5. The method of claim 3, further comprising:
predicting, by one or more processors, a root cause of a throughput slowdown during the SAN migration based on the IOPS and the throughput of the hardware devices.

6. The method of claim 1, further comprising:
determining, by one or more processors, the throughput of hardware devices operatively coupled to the target SAN according to a production throughput, wherein the production throughput is equal to total available bandwidth for SAN migration minus bandwidth used by currently running production workloads on the target SAN.

7. A computer program product for configuring transmission resources available to a source Storage Area Network (SAN) to comport with an estimated size and time of a SAN migration from the source SAN to a target SAN, wherein the computer program product comprises a non-transitory computer readable storage device having program instructions embodied therewith, the program instructions readable and executable by a computer to perform a method comprising:
determining throughput of hardware devices operatively coupled to a target Storage Area Network (SAN) prior to a SAN migration from a source SAN to the target SAN;

retrieving a soft state from a source SAN processor utilized by the source SAN, wherein the source SAN processor includes a processor core, wherein the soft state is stored in buffers within the processor core, and wherein each buffer within the processor core contains an intermediate execution output of a component within the processor core;

retrieving information from a Network Interface Card (NIC) queue in the source SAN and a Local Area Network (LAN) queue in the source SAN, wherein the NIC queue in the source SAN contains queued data to send to the target SAN, and wherein the LAN queue in the source SAN includes configuration packets used in the SAN migration;

determining an estimated time duration required to retrieve the soft state from a central processing unit (CPU) queue in the source SAN processor and the information from the NIC queue and the LAN queue in the source SAN, and to migrate the soft state of the processor core and the information from the NIC queue and the LAN queue in the source SAN from the source SAN to the target SAN;

determining an estimated size and time of the SAN migration from the source SAN to the target SAN based on the estimated time duration required to retrieve the soft state from the CPU queue in the source SAN processor and the information from the NIC queue and the LAN queue in the source SAN, an estimated time to migrate the soft state of the processor core and the information from the NIC queue and the LAN queue in the source SAN from the source SAN to the target SAN, and the throughput of the hardware devices; and configuring transmission resources available to the source SAN to comport with the estimated size and time of the SAN migration from the source SAN to the target SAN.

8. The computer program product of claim 7, wherein the method further comprises:
further determining the estimated size and time of the SAN migration by using a SAN virtualized switch, wherein the SAN virtualized switch simulates the throughput of the hardware devices operatively coupled to the target SAN by emulating switch ports used by the target SAN.

9. The computer program product of claim 8, wherein the method further comprises:
determining Input/output Operations Per Second (IOPS) of the hardware devices; and determining the IOPS and throughput of the hardware devices operatively coupled to the target SAN based on an M/M/1 queue of the SAN virtualized switch, wherein the M/M/1 queue represents a queue length of a queue for the SAN virtualized switch based on an arrival rate of packets at the SAN virtualized switch and a departure rate of packets from the SAN virtualized switch.

10. The computer program product of claim 9, wherein the method further comprises:

determining the arrival rate and the departure rate by a Poisson process that predicts the arrival rate and the departure rate at different predicted time points during the SAN migration.

11. The computer program product of claim 9, wherein the method further comprises:

predicting a root cause of a throughput slowdown during the SAN migration based on the IOPS and the throughput of the hardware devices.

12. The computer program product of claim 7, wherein the method further comprises:

determining the throughput of hardware devices operatively coupled to the target SAN according to a production throughput, wherein the production throughput is equal to total available bandwidth for SAN migration minus bandwidth used by currently running production workloads on the target SAN.

13. A computer system comprising:

one or more processors;

one or more computer readable memories;

one or more computer readable storage mediums; and program instructions stored on at least one of the one or more computer readable storage mediums for execution by at least one of the one or more processors via at least one of the one or more computer readable memories to perform a method comprising:

determining throughput of hardware devices operatively coupled to a target Storage Area Network (SAN) prior to a SAN migration from a source SAN to the target SAN;

retrieving a soft state from a source SAN processor utilized by the source SAN, wherein the source SAN processor includes a processor core, wherein the soft state is stored in buffers within the processor core, and wherein each buffer within the processor core contains an intermediate execution output of a component within the processor core;

retrieving information from a Network Interface Card (NIC) queue in the source SAN and a Local Area Network (LAN) queue in the source SAN, wherein the NIC queue in the source SAN contains queued data to send to the target SAN, and wherein the LAN queue in the source SAN includes configuration packets used in the SAN migration;

determining an estimated time duration required to retrieve the soft state from a central processing unit (CPU) queue in the source SAN processor and the information from the NIC queue and the LAN queue in the source SAN, and to migrate the soft state of the processor core and the information from the NIC queue and the LAN queue in the source SAN from the source SAN to the target SAN;

determining an estimated size and time of the SAN migration from the source SAN to the target SAN based on the estimated time duration required to retrieve the soft state from the CPU queue in the source SAN processor and the information from the NIC queue and the LAN queue in the source SAN, an estimated time to migrate the soft state of the processor core and the information from the NIC queue and the LAN queue in the source SAN from the source SAN to the target SAN, and the throughput of the hardware devices; and configuring transmission resources available to the source SAN to comport with the estimated size and time of the SAN migration from the source SAN to the target SAN.

14. The computer system of claim 13, wherein the method further comprises:

further determining the estimated size and time of the SAN migration by using a SAN virtualized switch, wherein the SAN virtualized switch simulates the throughput of the hardware devices operatively coupled to the target SAN by emulating switch ports used by the target SAN.

15. The computer system of claim 14, wherein the method further comprises:

determining Input/output Operations Per Second (IOPS) of the hardware devices; and determining the IOPS and throughput of the hardware devices operatively coupled to the target SAN based on an M/M/1 queue of the SAN virtualized switch, wherein the M/M/1 queue represents a queue length of a queue for the SAN virtualized switch based on an arrival rate of packets at the SAN virtualized switch and a departure rate of packets from the SAN virtualized switch.

16. The computer system of claim 15, wherein the method further comprises:

determining the arrival rate and the departure rate by a Poisson process that predicts the arrival rate and the departure rate at different predicted time points during the SAN migration.

17. The computer system of claim 15, wherein the method further comprises:

predicting a root cause of a throughput slowdown during the SAN migration based on the IOPS and the throughput of the hardware devices.

* * * * *